United States Patent [19]

Sidey

[11] Patent Number: 4,986,111
[45] Date of Patent: Jan. 22, 1991

[54] NON-CONTACTING GAUGE FOR SURFACES

[75] Inventor: Roger C. H. Sidey, London, England

[73] Assignee: The British Petroleum Company p.l.c., London, England

[21] Appl. No.: 392,237

[22] Filed: Aug. 10, 1989

[30] Foreign Application Priority Data

Aug. 17, 1988 [GB] United Kingdom ............... 8819575

[51] Int. Cl.$^5$ ............................................ G01B 13/12
[52] U.S. Cl. ................................................... 73/37.5
[58] Field of Search ..................... 73/37.5, 37.6, 37.8; 33/DIG. 2

[56] References Cited

U.S. PATENT DOCUMENTS

| 3,850,024 | 11/1974 | Sumitomo | 73/37.5 |
| 3,863,493 | 2/1975 | Busenkell | 73/37.5 |
| 4,325,248 | 4/1982 | Kolosov | 73/37.5 |

FOREIGN PATENT DOCUMENTS

| 867168 | 2/1953 | Fed. Rep. of Germany . | |
| 2219517 | 12/1972 | Fed. Rep. of Germany . | |
| 2276564 | 1/1976 | France . | |
| 375479 | 3/1973 | U.S.S.R. | 73/37.5 |
| 927076 | 5/1963 | United Kingdom . | |
| 1122115 | 7/1968 | United Kingdom | 73/37.5 |
| 1349534 | 4/1974 | United Kingdom . | |
| 1358449 | 7/1974 | United Kingdom . | |
| 1382706 | 2/1975 | United Kingdom . | |
| 1406053 | 10/1975 | United Kingdom . | |

Primary Examiner—Hezron E. Williams
Attorney, Agent, or Firm—Larry W. Evans; Joseph G. Curatolo; Teresan W. Gilbert

[57] ABSTRACT

A non-contacting gauge for measuring small variations in the surfaces of objects comprises:
(a) a chamber separated into two sub-chambers by a vibrating diaphragm,
(b) a nozzle for each sub-chamber,
(c) a reference surface adjacent to one of the nozzles, and,
(d) a frame holding the chamber and reference surface moveable relative to the surface to be gauged and adapted to bring the other nozzle into the vicinity of the surface.

The gauge is a versatile instrument which, while particularly suitable for measuring changes in the dimensions of geological core samples to determine residual strains, is also suitable for a range of measurement problems.

8 Claims, 1 Drawing Sheet

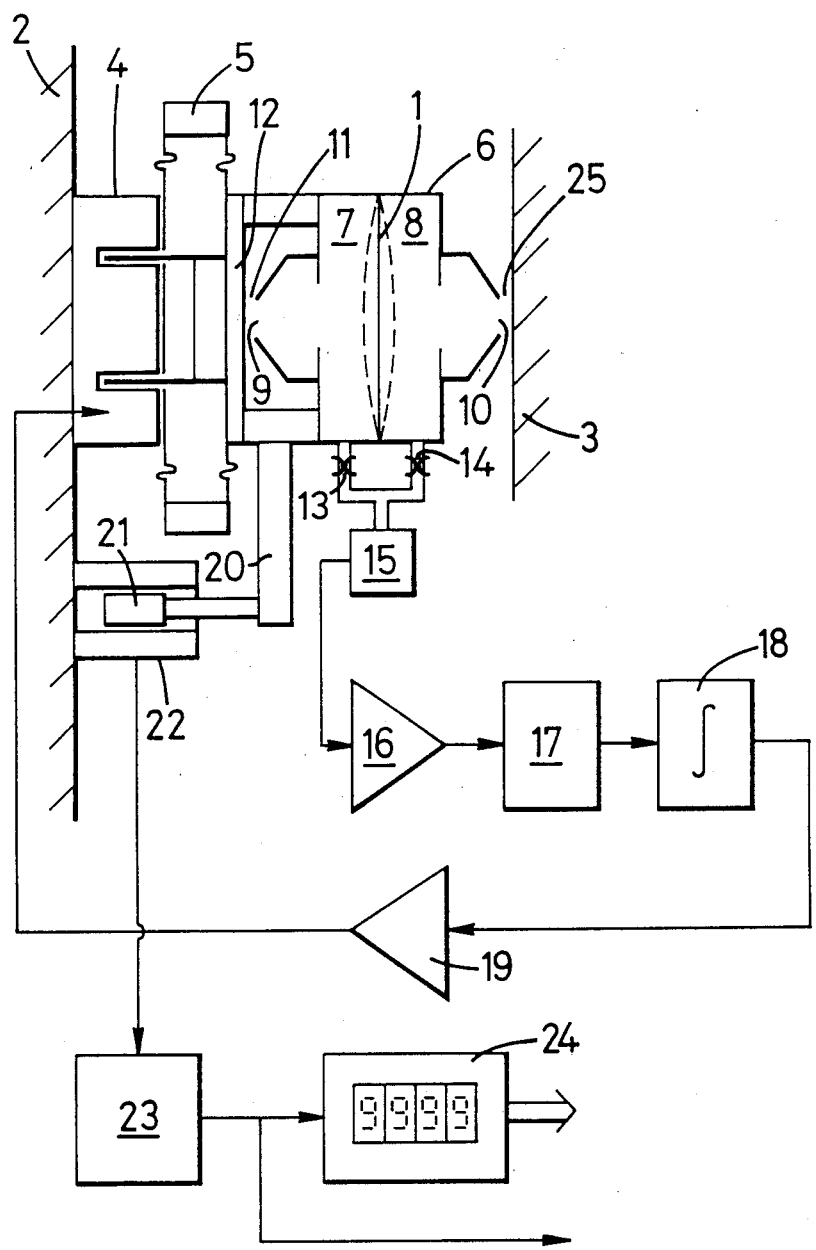

NON-CONTACTING GAUGE FOR SURFACES

FIELD OF THE INVENTION

This invention relates to a non-contacting gauge to measure small variations in the surfaces of objects, and particularly to a non-contacting acoustic gauge.

BACKGROUND OF THE INVENTION

There are a large number of situations where it is desirable to be able to measure small variations (e.g. of the order of ±0.5 microns) in the dimensions of surfaces.

One such situation is the measurement of the diameter of core samples from a subterranean rock formation. As explained in U.K. Patent Application No. 8911773, stresses in subterranean rock formations may be determined by measuring residual strains in core samples recovered from the formations. If the recovered core is cut exposing a fresh surface and relieving the stress, the core will expand with the greatest expansion occuring in the areas where it was subjected to the greatest stress and the least expansion occurring in the areas of least stress. In this U.K. Application the measurements are made using strain gauges placed on a face of the core. Measurement using strain gauges is an accurate but time consuming method. Stress determination using this basic method would be simplified and speeded up if an instrument capable of direct measurement of the expansion over different parts of the core was available.

There are a number of potential ways of measuring small changes in the dimensions of surfaces and objects and some instruments are available on the market. All the current methods and instruments have potential drawbacks, however, as summarized below:

(a) Contacting Stylus or Roller

With this method there is direct contact with the object to be measured. Instruments using this method are not generally tolerant of dirt or contamination, and their performance tends to deteriorate due to wear. They are also adversely affected by poor surface finish or roughness of the object and they cannot be used on delicate surfaces that could be damaged by the contact.

(b) Capacitive Gap Measurement

The capacitance gap system works by measuring the electrostatic capacitance between the surface to be profiled and a parallel plate electrode assembly. It overcomes many of the problems associated with the mechanically contacting system but has the disadvantage that it requires that the gauged surface be electrically conducting. Whilst this can be achieved by the use of special spray or paint on coatings, it does necessitate an additional stage of sample preparation. Also, the system is not tolerant of contamination or humidity.

(c) Inductive Measuring System

The inductive gauges are based on the eddy current principle. The electromagnetic field, from a high frequency alternating current in a coil, induces eddy currents in the target material. This in turn modifies the impedance of the coil; the change in impedance is a function of the gap and the target. This technique also requires a metallic target.

(d) Optical Interferometry

Optical interferometric techniques are capable of measuring to high levels of resolution. Amongst their prime advantages are the wide range and sensitivity of measurement; they are also inherently non-contacting. Unfortunately, like the capacitive system they do require special surface treatment or preparation to operate. For a simple laser interferometer this might consist of specially attached optical flats or retroreflectors. This would seriously limit the ease with which the core could be handled. In addition, instruments using this method tend to be costly and bulky.

It will be seen from the above summary that the methods listed have drawbacks and limitations not only for core sample measurements but also lack versatility for the measurement of other surfaces and objects.

The instrument of the present invention is based on a pressure sensing nozzle system. Such systems are well suited to gauging rough or sensitive surfaces, are non-contacting, and do not require a special surface finish. Instruments using the method can be compact, rugged and relatively cheap.

Nevertheless there are limitations even to pressure sensing nozzle systems, particularly systems using a single nozzle and systems in which the pressure is generated by an air or gas jet. The present invention is based on a development of the pressure nozzle system using a vibrating diaphragm to generate pressure perturbations and with a reference nozzle as well as a measurement nozzle.

SUMMARY OF THE INVENTION

According to the present invention, a non-contacting gauge for measuring small vibrations in the surfaces of objects comprises:

(a) a chamber separated into two sub-chambers by a vibrating diaphragm, (b) a nozzle for each sub-chamber, (c) a reference surface adjacent to one of the nozzles, and, (d) a frame holding the chamber and reference surface moveable relative to the surface to be gauged and adapted to bring the other nozzle into the vicinity of the surface.

DETAILED DESCRIPTION OF THE INVENTION

The relative movement as between frame (and hence chamber) and the surface is desirably in a plane perpendicular to the surface and may be effected by moving either the frame or the surface. Preferably, the frame is moveable, and such a moveable frame may also have means for holding the object to be measured. The means for holding the object should hold the object steady with respect to the chamber, but may allow for rotation of the object. Thus in the case of a core sample or other generally cylindrical object, the means may be a rotatable table.

The moveable frame should have the capacity to move within the fixed frame towards or away from the surface of the object, but may have other relative degrees of freedom also, i.e., to move along or across the surface. In the case of cylindrical objects it may be free to rotate around the object, in which case the object may be fixed, the required rotation being applied to the moveable frame rather than the object.

As with rotation, it is relative movement as between chamber and surface that is important. This movement along or across a surface may be effected by rendering either the frame or the object whose surface is to be gauged capable of controlled movement.

However, for simplicity and ease of measurement, it is the frame which is preferably moved relative to a fixed surface, at least with respect to the perpendicular movement. Relative rotational movement is most conveniently done by rotating the object; other movements may more conveniently rely on movement of the frame.

The gauge operates on the principle of balancing the perturbation of ambient pressure generated by the diaphragm on the sub-chambers on either side of the diaphragm. The system is designed such that all dimensions are much smaller than a wavelength at the chosen diaphragm vibrating frequency. The nozzle of one sub-chamber is adjacent to the reference surface and the distance of this nozzle to the reference surface is fixed. By moving the moveable frame and hence the chamber and reference surface towards or away from the surface to be gauged, the pressure in the other sub-chamber can be balanced with the reference sub-chamber. Preferably the nozzles are identical so that the balance is achieved when the non-reference gauging nozzle is at a distance from the surface to the gauged identical to the distance of the reference nozzle from the reference surface. When gauging rough or uneven surfaces (a particularly useful application of the nozzles) the distance of the gauging nozzle to the gauging surface is difficult to compare with the distance of the reference nozzle to the reference surface. Under these conditions it is the balance of constriction of the nozzles which is important.

It would, however be possible to use non-identical nozzles, the system then being based on and calculated with reference to a defined degree of imbalance.

The movement of the moveable frame to achieve balance may be effected automatically, with a pressure sensor or sensors associated with the two sub-chambers being used to generate a signal which powers a motor to move the frame. The movement of the frame may be monitored by a transducer and again converted automatically to a signal which may be fed to a microprocessor or other computer which converts the movement to actual measurement of the surface.

The present invention includes a method of measuring small variations in the surfaces of objects using a gauge according to the present invention and manipulated as hereinbefore and hereinafter described.

The use of a pressure perturbation balancing system gives a number of advantages over the pressure systems relying on an air or gas flow and/or using a single nozzle only as follows:

(a) the system uses fluctuating air or gas pressure instead of steady flow. The error or imbalance quantities thus become narrow band ac signals with the result that the system offers very high measurement resolution and freedom from drift.

(b) no air or gas supply is required and, because the system is ratiometric and null balancing, it is unaffected by local changes in ambient pressure, temperature and moisture.

(c) there is no steady component of gauging force and only a negligible fluctuating component. The system thus does not disturb the gauged surface by applying loads, or by changing the local temperature or moisture conditions.

These features and advantages make the gauge suitable not only for measuring changes in the dimensions of core samples for the purposes previously described, but give it the versatility for a range of measurement problems, viz., (a) high resolution industrial gauging where dependence on a stable gas supply or stability of local ambient pressure is critical, (b) gauging of sensitive or delicate surfaces, coatings, films and membranes (i.e. semiconductor wafers, biological specimens, filter deposits etc.), (c) gauging of liquid levels, (d) gauging in hazardous environments, i.e. within explosive atmospheres or in the vicinity of toxic substances where the introduction of an external gas supply would be unacceptable, (e) gauging of rough or uneven surfaces (abrasives, construction materials, textiles, powder or granular material surfaces), and (g) gauging within liquid media (immersed objects).

The invention is illustrated with reference to the accompanying drawing, which is a schematic representation of a gauge according to the present invention.

In the drawing, a gauge has a fixed frame 2, which supports an object the surface of which, 3, is to be measured. Frame 2 supports a linear thrust motor 4 which can move a moveable frame 5 towards or away from surface 3. Moveable frame 5 supports a chamber 6, which is divided into two sub-chambers 7,8 by a vibrating diaphragm 1. Each sub-chamber 7,8 has a nozzle 9,10 which are identical in shape and size. Left hand nozzle 9 is a reference nozzle positioned at a fixed distance from a reference surface 12. Right hand nozzle 10 is the gauging nozzle which can be brought into the vicinity of surface 3 by movement of moveable frame 5.

Passages with flow restrictors 13, 14 lead from each sub-chamber to a pressure sensor 15. Signals generated in pressure sensor 15 are fed through a pre-amplifier 16, a null detector 17, an integrator 18 and a further amplifier 19 to the linear thrust motor 4.

Moveable frame 5 has an arm 20 supporting a moveable portion 21 of a LVDT—Linear Variable Differential Transformer, transducer 22, which is fixed to frame 2. Transducer 22 generates signals indicative of the movement of frame 5 which are fed to a signal conditioner 23 and thence to a digital read-out 24 and a suitable computer for recording and analysing the signals. In operation, diaphragm 1 is caused to vibrate in the fundamental diaphragm mode creating antiphase in the ambient pressures in the air in sub-chambers 7,8. If, as is likely initially, reference gap 11 is not the same as the gap between gauging nozzle 10 and object surface 3 (shown in the drawing as gauging gap 25), or the constrictions of the nozzles are not equal, the magnitude of the antiphase perturbations will be unequal and will thus result in an output from the null pressure sensor 15. Signals from the pressure sensor will then activate linear thrust motor 4 to move frame 5 until the reference gap 11 and gauging gap 25 are the same and the pressure perturbations are equalised. Movement then ceases. An instantaneous reading of the dimension of the surface opposite gauging nozzle 10 is thus obtained.

If frame 5 and nozzle 10 are now moved relative to the surface in a direction other than perpendicular to it (e.g. in the case of a cylindrical object, by relative rotation, or by relative movement across or along the surface) then any change in dimension will alter the gauging gap relative to the reference gap, causing a pressure perturbation imbalance between the sub-chambers and generating a signal moving frame 5 to eliminate the difference between the gaps and re-balance the pressures. Such movement can be recorded to give a profile of the surface.

The gauge can thus provide both point measurements and generate profiles showing up any variations in a surface.

SPECIFIC EMBODIMENTS OF THE INVENTION

In a specific instrument the vibrating diaphragm was actuated using a piezoelectrically driven metal disc. Here a thin sliver of piezolectric material is bonded to a metal diaphragm. As the piezolelectric material expands under the action of an applied voltage the surface of the metal disc is strained and caused to flex (in a similar manner to the action of a bi-metallic flexure). If the energizing supply to the piezoelectric sliver is a steady frequency, the diaphragm is caused to flex at this frequency. In the prototype a 20 mm metal disc was used, energized by a 14 mm diameter radially expanding piezoelectric disc. The nozzle apertures were 3.0 mm in diameter, the reference gap 0.3 mm and the reference surface was metal with a fine machined finish. When used to measure the dimension of core samples from underground rock formations, the instrument had a measurement range of 1 mm, an accuracy of ±0.5 microns and a resolution of 0.1 microns (100 nanometers). It was thus capable of measuring strains with an accuracy and repeatibility of ±5 microns for a core sample with a nominal core diameter of 100 mm.

It will be appreciated, however, that larger or smaller gauges could be produced operating on the same principle.

I claim:
1. A non-contacting gauge for measuring small variations in the surfaces of objects comprising
    (a) a chamber separated into two sub-chambers by a vibrating diaphragm,
    (b) a nozzle for each sub-chamber,
    (c) a reference surface adjacent to one of the nozzles, and,
    (d) a frame holding the chamber and reference surface moveable relative to the surface to be gauged and adapted to bring the other nozzle into the vicinity of the surface.
2. A gauge according to claim 1 wherein the relative movement between the frame and the surface to be gauged is in a plane perpendicular to the surface.
3. A gauge according to claim 1 wherein the frame is moveable.
4. A gauge according to claim 3 wherein the moveable frame has means for holding the object to be measured.
5. A gauge according to claim 4 wherein the means for holding the object is a rotatable table.
6. A gauge according to claim 1 wherein the nozzles for each sub-chamber are identical.
7. A gauge according to claim 3 wherein the movement of the moveable frame to achieve balance is effected by means of a pressure sensor or sensors associated with the two sub-chambers adapted to generate a signal which powers a motor to move the frame.
8. A gauge according to claim 7 comprising a transducer for monitoring the movement of the frame and generating a signal convertable to measurement of the surface.

* * * * *